Patented July 7, 1953

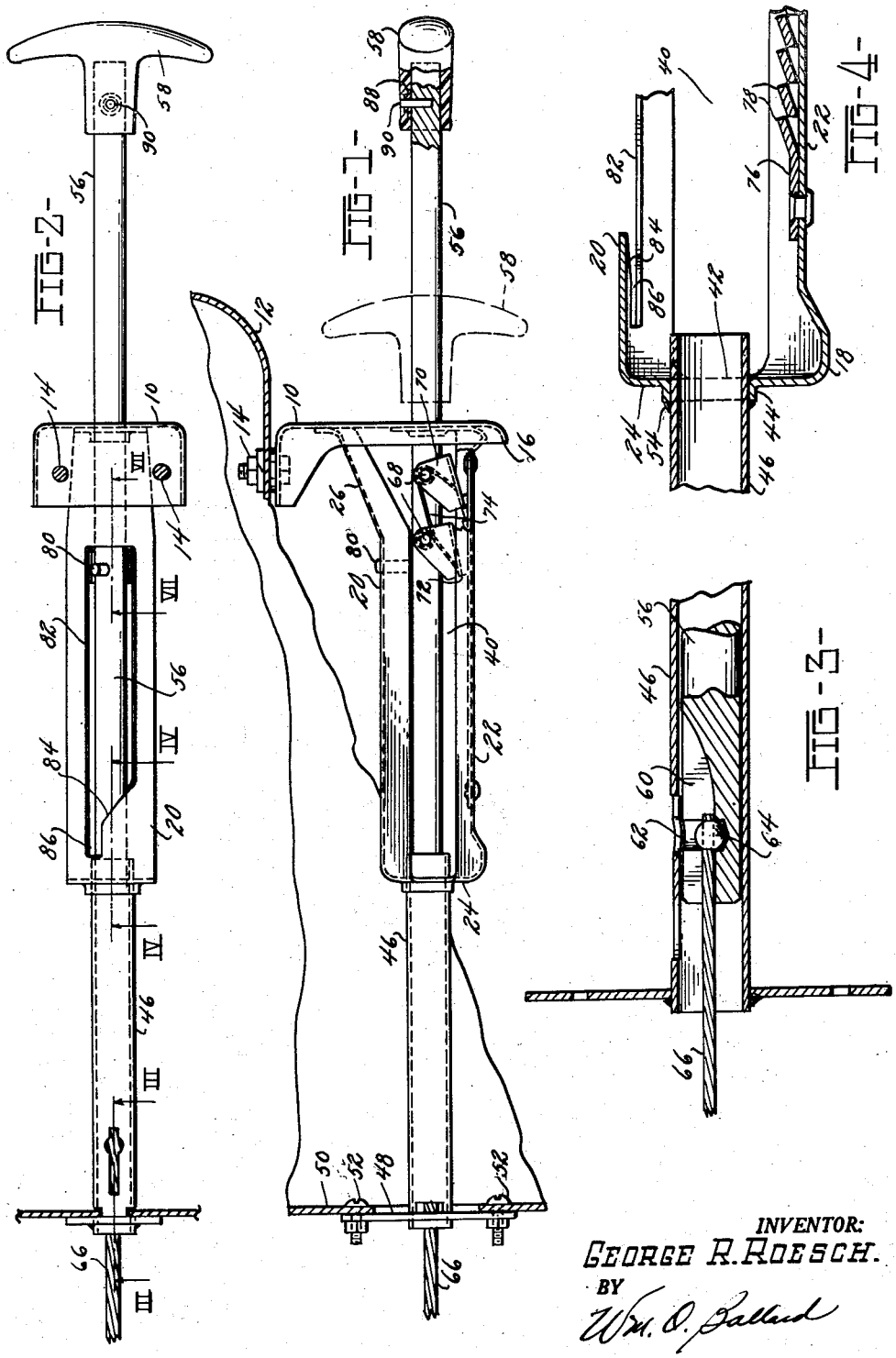

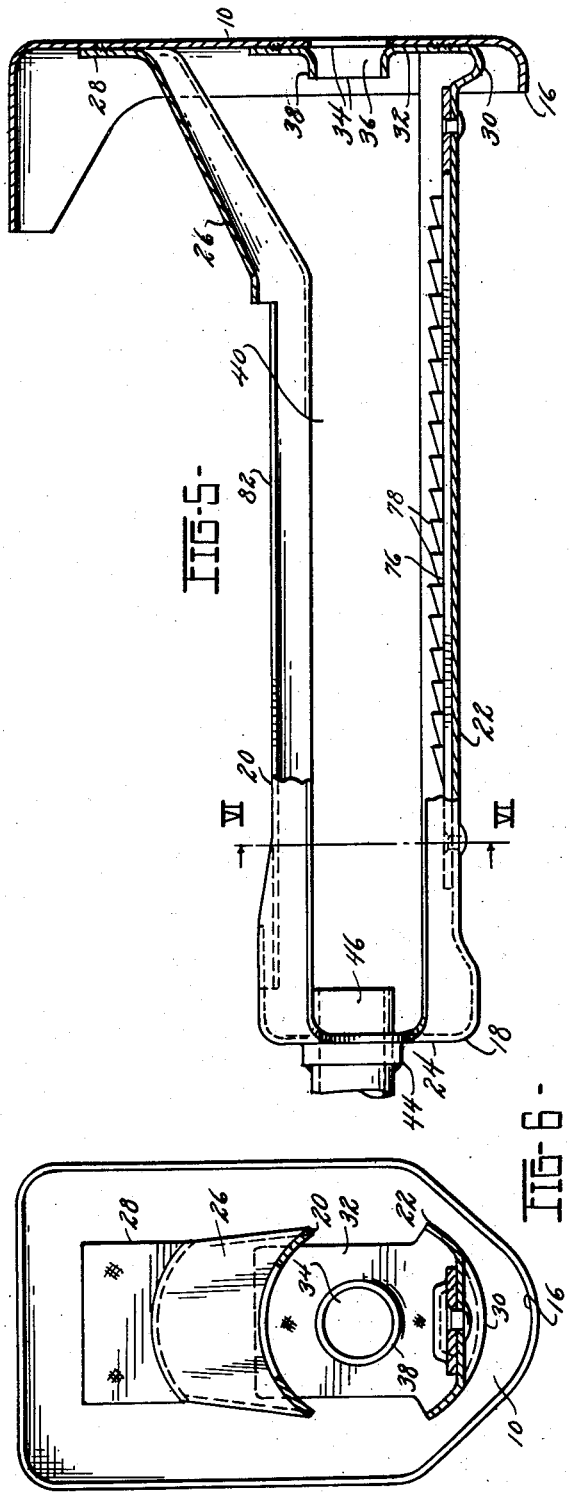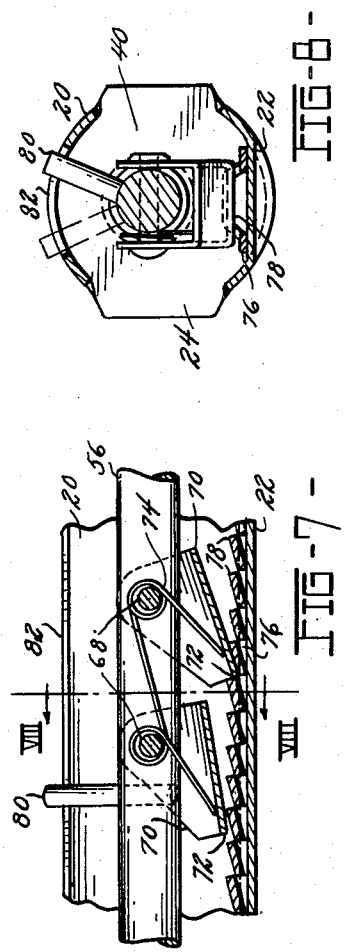

2,644,342

UNITED STATES PATENT OFFICE 2,644,342

BRAKE LEVER

George R. Roesch, Toledo, Ohio, assignor to The Rush Stamping Company, Toledo, Ohio, a corporation of Ohio Application August 21, 1952, Serial No. 305,589

8 Claims. (Cl. 74—503)

This invention relates to brake lever mechanisms, particularly adapted for operating and controlling the brakes of a motor vehicle.

An object of this invention is to provide a brake control wherein straight line operation of a grip can cause brakes to be set or released at will.

Another object of this invention is to provide a novel pawl and ratchet arrangement within the mechanism by which brakes can be controlled.

Another object of this invention is to provide a sturdy, yet lightweight, mechanism comprising parts, the majority of which are sheet metal stampings, and the remainder of said parts of equally economical construction.

And another object of this invention is to provide a grip assembly of attractive yet sturdy construction.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of the control mechanism embodying the invention herein;

Fig. 2 is a plan view of the mechanism of Fig. 1;

Fig. 3 is a section on the line III—III, Fig. 2;

Fig. 4 is a section on the line IV—IV, Fig. 2;

Fig. 5 is an enlarged side elevation of the primary frame member;

Fig. 6 is a view on the line VI—VI, Fig. 5;

Fig. 7 is a view on the line VII—VII, Fig. 2; and

Fig. 8 is a view on the line VIII—VIII, Fig. 7.

Bracket 10 is attached to the lower edge of an instrument panel 12 by means of suitable fastening elements 14. This bracket may be a stamping, suitably embossed to present an attractive appearance on the front thereof, and provided with a marginal flange 16 for rigidity. At the rear of this bracket 10 there is provided a main frame member 18 of U-shape providing a pair of spaced substantially parallel legs 20, 22 connected together at one end by an integral plate portion 24.

The opposite or remote portion of the leg 20 includes a strut portion 26 terminating in an outwardly extending flange 28 welded to the rear of the bracket 10. The leg 22, remote from the portion 24, is provided with a return bend 30 extending to flange 32, also welded to the rear of the bracket 10. The flange 32 and the bracket 10 are provided with co-extensive apertures 34 forming a bearing 36. This bearing 36 includes a collar 38 pressed from the flange 32 inwardly toward the clearway 40 between the legs 20, 22.

The plate portion 24 is provided with an aperture 42 therethrough surrounded by a collar 44 forming a second bearing, in coaxial alignment with the first bearing 36, spaced therefrom by the length of the clearway 40. This second bearing mounts one end of a tubular element 46 outwardly extending from the main frame member 18, and the remote end of such tube is supported in a bracket plate 48 mounted on the bulkhead 50 of the motor vehicle, by means of suitable fastening elements 52.

In various makes of cars the distances between the instrument panels 12 and the bulkheads 50 vary, and the frame structure herein described may readily be adapted to span this distance by telescoping the tube 46 a required distance through the bearing 42 and locking the same by weld 54. There is thus provided a frame mounted by and between the instrument panel and the bulkhead providing a pair of spaced aligned bearings, with the bearings rigidly held in alignment by the bridge elements 20, 22. Reciprocably and rockably mounted by the bearings 36, 42 is a cylindrical rod 56. On its forward end the rod may mount a T-shaped or other conveniently designed grip 58, while the remote end of the rod is provided with a longitudinal slot 60 having an intermediate seat 62 for receiving the bead 64 of a cable 66 extending from the brake mechanism of a motor vehicle. By pulling the grip 58 away from the bracket 10 the cable 66 will set the brakes, while release of the grip allows the brake mechanism to be released and the cable 66 will draw the grip 58 toward the bracket 10.

Means are provided to hold the grip as pulled away from the bracket 10 and thereby hold the brakes set. To this end the rod 56 is provided with a pair of pins 68 diametrically extending therethrough to provide trunnions for mounting U-shaped pawl elements 70, which elements have their forward edges 72 normally urged outwardly from the rod 56 by means of a spring 74 terminally engaging the pawls and intermediately extending about the pins 68.

Mounted on the inner side of the leg 22 is a plate 76 embossed to provide a series of teeth 78 in alignment therealong. The edges 72 of the pawls 70 act with the teeth 78 in holding the rod 56 in brake set position. The distance between the pawl edges 72 is such that only one pawl is set at any one time, thus allowing a holding of the brake setting in increments of one-half a rack tooth 78.

To release the mechanism it is only necessary to rotate or rock the grip 58, thereby swinging the pawls clear of the ratchet plate 76 and the rod may then be returned to brake release position. Mechanism is provided so that as the rod 56 approaches its normal or brake released position, the pawls are automatically swung back into ratchet engaging position. To this end, pin 80 diametrically extending outwardly from the rod 56, extends through slot 82 in leg 20. This slot 82 has a major portion wide enough to allow the pin to be swung in the rocking of the shaft 56 sufficiently far to allow the pawls to be disengaged. However, the inner end of the slot is provided with a cam portion 84 extending to a narrowed slot portion 86 and as the pin 80 approaches that end of the slot, it engages the cam 84 and is moved into the slot portion 86 and by such movement causes the grip 58 to be rocked back to its normal horizontal position.

The grip 58 may be a plastic molding to match other accessories within the vehicle and has a flanged bushing 88 molded thereinto so that pin 90 may extend therethrough and into the handle 56, to not only mount the grip 58 upon the handle, but to receive the strain exerted upon the grip and prevent looseness or breakage of the molded element.

It is to be noted herein that all of the major parts are stampings, with the exception of the rod 56 and the grip 58, so that there is an extremely economical production of the mechanism, while at the same time, the parts are so assembled in relationship to each other that an extremely sturdy construction results.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the element of the invention is employed for purposes of description and not of limitation, and it is not intended to limit the scope of the following claims beyond the requirements of the prior art.

What is claimed and desired to secure by United States Letters Patent:

1. In brake controlling mechanism of the class described, a first bracket adapted to be attached to the instrument panel of a motor vehicle, a second bracket adapted to be mounted on the bulkhead of said vehicle, said brackets providing a pair of spaced axially aligned bearings, a rod reciprocably and rockably mounted in said bearings, a pawl pivotally attached to said rod, a bridge plate extending between said bearings, and a ratchet mounted by said plate for coacting with said pawl to provide a ratchet and pawl connection therebetween.

2. In brake controlling mechanism of the class described, a U-shaped member embodying a pair of spaced substantially parallel legs having their terminii at one end interconnected by an angular continuation of said legs, the opposite terminii embodying flanges, a plate mounted on said flanges and provided with an aperture through said plate and one of said flanges to form a first bearing, a shouldered aperture through said continuation between the legs providing a second bearing in axial alignment with said first bearing, a rod reciprocably and rockably mounted in said bearings, a pawl hingedly mounted on said rod, and teeth on one of said legs with which said pawl may coact to provide a rack and tooth relationship between said member and rod.

3. The structure set forth in claim 2 wherein the teeth are provided by a plate fixed along the inner side of one of said legs.

4. The structure set forth in claim 2 wherein one of said legs is provided with a longitudinal slot provided with cam forming edges, and a pin diametrically extending from said rod into the slot, whereby movement of the pin along said slot effects a rotary movement of the rod during its reciprocation.

5. The structure set forth in claim 2 wherein a tube is intermediately mounted in said second aperture to provide a bearing support for the rod for a predetermined length beyond the reach of said U-shaped member.

6. The structure set forth in claim 2 wherein said rod is provided with a T-shaped handle for manual reciprocation thereof, said handle embodying a molded body including a rod embracing skirt and wings therefrom, and having a bushing completely embedded therein about an opening through the skirt, and a pin through said bushing and rod to lock said handle thereon.

7. In brake controlling mechanism of the class described, a first bracket adapted to be attached to the instrument panel of a motor vehicle, a second bracket adapted to be attached to the bulkhead of said vehicle, a U-shaped frame having its terminii fixed to said first bracket and extending toward said second bracket, said first bracket having an aperture therethrough and said frame having a spaced aperture in axial alignment therewith, a tube mounted in said latter aperture and extending therefrom to said second bracket, said tube and first bracket aperture providing a pair of spaced aligned bearings, a rod reciprocably mounted in said bearings, said rod having a handle on one end adjacent said first bracket, pawls hingedly attached to said rod between said bearings, and teeth along one leg of said U-shaped frame with which said pawl may coact.

8. In brake controlling mechanism of the class described, a bracket, a U-shaped member provided with a pair of legs and a plate portion connecting one pair of the legs terminii, the opposite ends being attached to said bracket, a pair of axially aligned bearings, one in said bracket and one in said plate portion, a rod reciprocably and rockably mounted in said bearings, ratchet and pawl means coacting between said rod and one of said legs to affect the longitudinal movement of said rod in said bearings, and cam and pin means coacting between said rod and the other leg to direct a rotary movement of said rod.

GEORGE R. ROESCH.

References Cited in the file of this patent

UNITED STATES PATENTS

| Number | Name | Date |
|---|---|---|
| 1,570,066 | Kurtz | Jan. 19, 1926 |
| 2,170,900 | Jandus et al. | Aug. 29, 1939 |
| 2,180,215 | Saunders et al. | Nov. 14, 1939 |
| 2,543,510 | Sandberg | Feb. 27, 1951 |
| 2,583,776 | Jacobs | Jan. 29, 1952 |